INVENTOR.
YOSHIZO YAMAMOTO

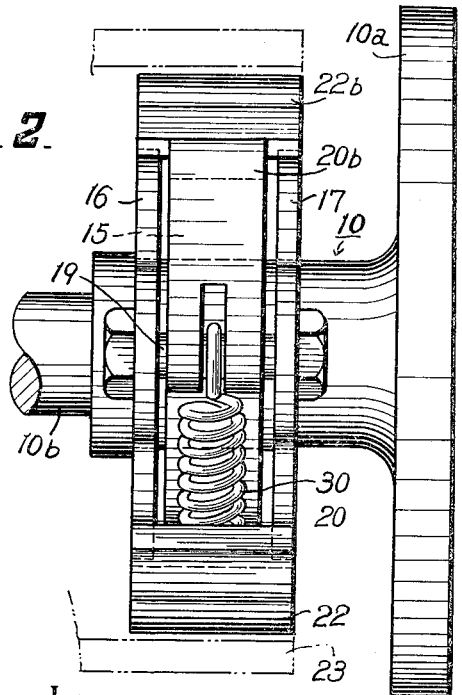
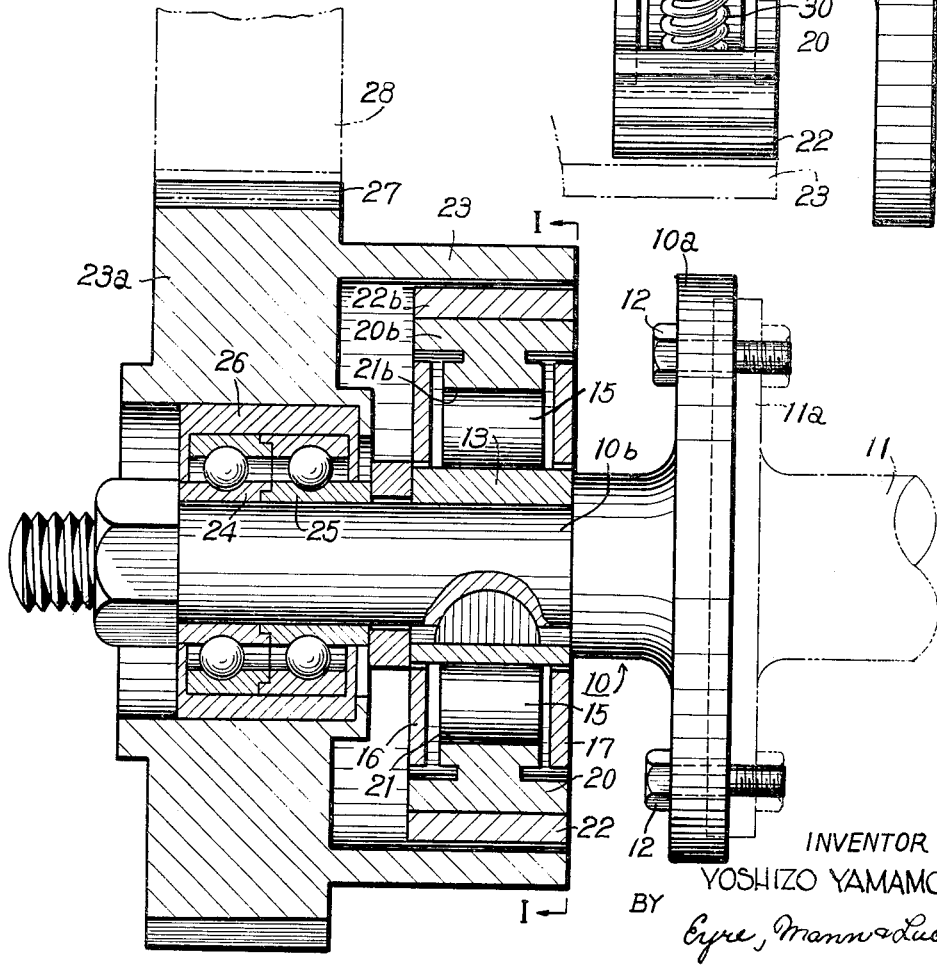

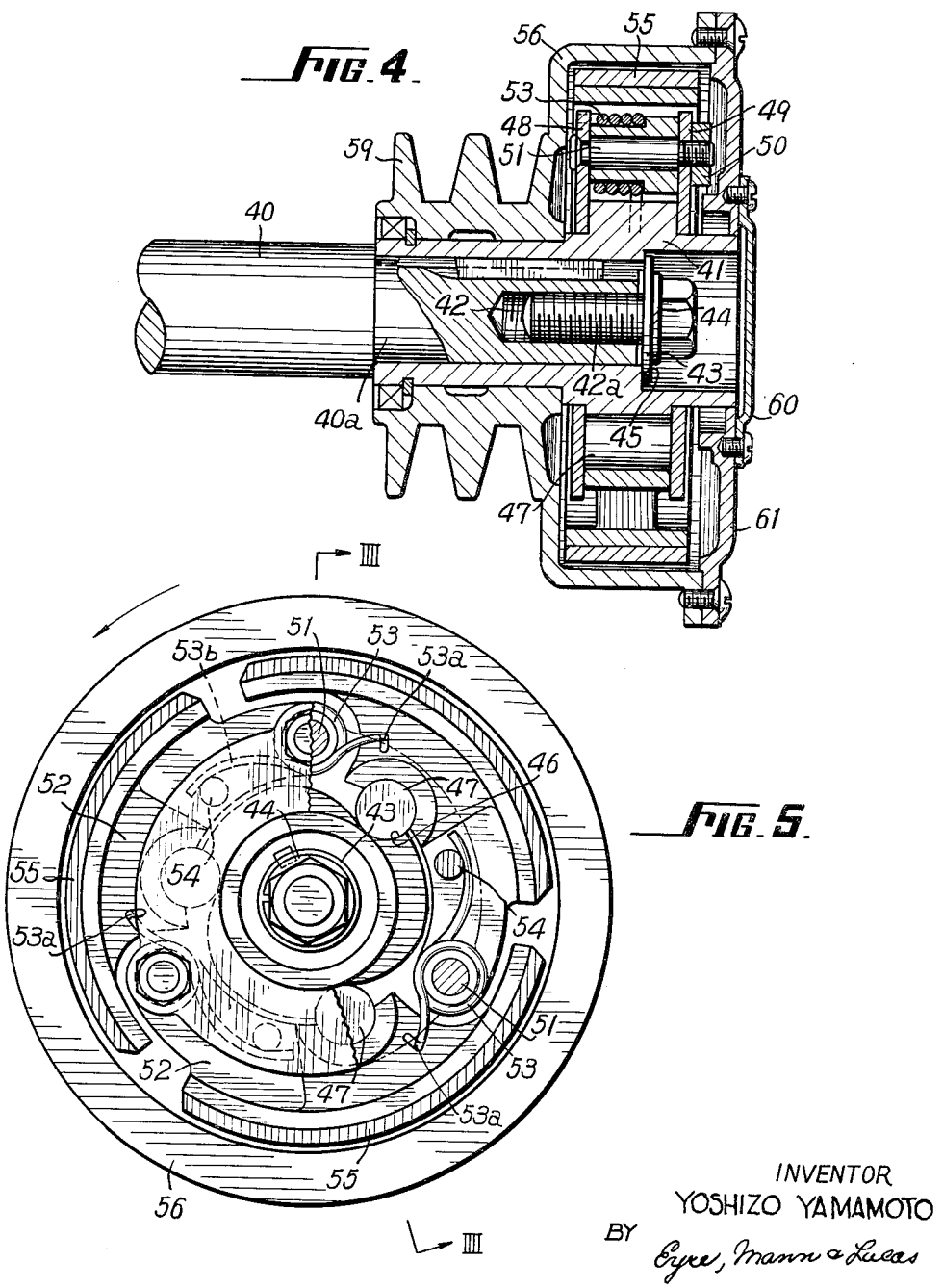

United States Patent Office 3,224,541
Patented Dec. 21, 1965

3,224,541
CENTRIFUGAL AND TORQUE RESPONSIVE
CLUTCH
Yoshizo Yamamoto, 1314 4-chome, Nakameguro,
Meguro-ku, Tokyo, Japan
Filed Feb. 3, 1964, Ser. No. 342,025
Claims priority, application Japan, May 22, 1963,
38/25,512
3 Claims. (Cl. 192—105)

This invention relates to improvements in and relating to centrifugal clutches.

Conventional centrifugal clutches operate commonly on the principle that the centrifugal force induced in centrifugal weight masses is utilized for expanding the clutch shoes for the establishment of engagement of the clutch. The expanding action must overcome the urging force provided by spring means which act normally upon the centrifugal masses so as to keep them in their contracted position.

It will thus be clear that the centrifugal force per se must overcome the action of the urging springs. With such conventional design of clutches, centrifugal masses must be large in their size and heavy in their weight and thus the whole clutch assembly must be large and complicated if, especially, a high sensitivity should be realized at a slower speed of the prime mover such as, for instance, an internal combustion engine.

It is therefore an object of the present invention to provide a highly sensitive centrifugal clutch wherein the clutch actuating action is highly assisted by the self-servo-action derived from the driving system.

It is a further object of the present invention to provide a clutch assembly wherein the speed at which the clutch engages or briefly the clutch-engaging speed is easily modified by altering certain simple means at the design stage.

A still further object of the invention is to provide a clutch assembly which is highly simple in its design, highly sensitive in its operation and very cheap to manufacture.

These and further objects of the present invention will become clear from the following detailed description with reference to the accompanying drawings in which:

FIG. 2 is a side elevation of essential working parts of the clutch shown in FIG. 1;

FIG. 3 is a longitudinal section of the clutch shown in FIGS. 1–2, taken on the line III—III of FIG. 1 yet represented on a larger scale;

FIG. 4 is a longitudinal section of a second embodiment of the invention, being taken on the sectional plane IV—IV in FIG. 5;

FIG. 5 is a front view of the clutch assembly shown in FIG. 4 wherein, however, a front cover assembly has been omitted for better showing the inside operating members.

Figure 1:
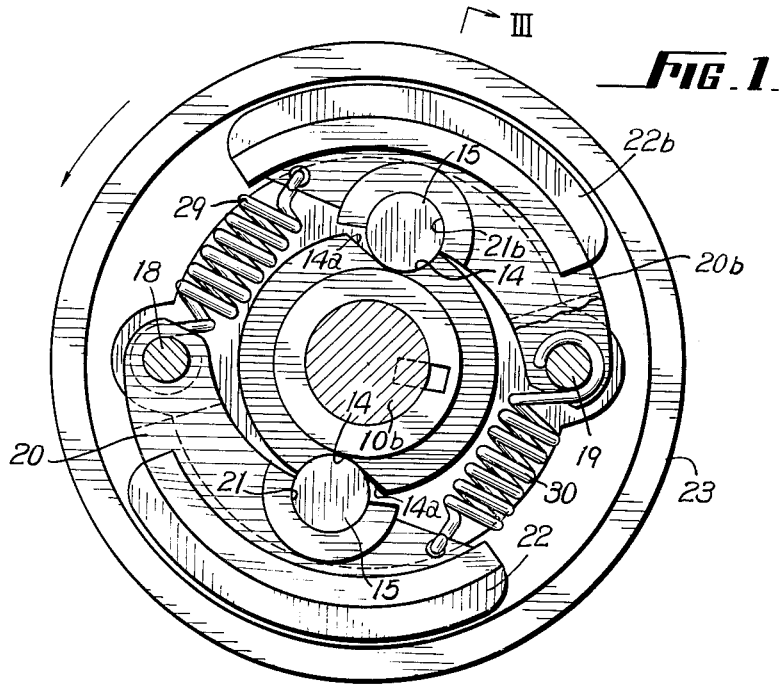
FIG. 1 is a cross-section of a first embodiment of the invention wherein, however, a mounting ring has been removed for showing clearly the inner operating parts.

Now referring to the accompanying drawings, especially FIGS. 1–3 thereof, a first embodiment of the invention will be described.

10 denotes a drive shaft which is formed at one end with a coupling flange 10a. An engine shaft 11, shown only schematically and partially, is formed at its shown end with a flange 11a which is drivingly connected with the said coupling flange by means of a plurality of fixing bolts 12 of which only two are shown in FIG. 3. Although not shown, the engine shaft is connected in turn drivingly with the crankshaft of an internal combustion engine. If desired, a conventional flexible coupling may be provided between the coupling flanges 10a and 11a. As conventionally, the shafts 10 and 11 are rotatably supported although the necessary bearings have been omitted from the drawing for the simplicity and clarity thereof. This will apply also to FIGS. 4–6 which represent a second embodiment of the invention.

The drive shaft 10 has a reduced section 10b on which a stepped ring 13 is fixedly mounted. Two axial recesses 14 are formed in the periphery of the ring and receive loosely rollers 15 in one-to-one relation. One side of the recess as at 14a is formed into an inclined surface which acts as a cam surface for the related roller as will be more fully described hereinafter.

At both sides of the rollers 15, there are provided a couple of mounting rings 16 and 17 separated small distances from the rollers. These rings are loosely mounted on the roller-supporting ring 13 as most clearly seen from FIG. 3. Two bolts or pins 18 and 19 pass through rings 16 and 17 and are fixed in position by nuts. A clutch shoe 20 is pivotally mounted on pin 18 and formed with a semi-cylindrical recess 21 for receiving one of the rollers 15. Friction element 22 is lined on the outer periphery of the clutch shoe for co-operation with the internal wall surface of a follower drum 23 which is rotatably mounted on the reduced section 10b of drive shaft 10 by means of a pair of ball bearings 24 and 25 through the intermediary of a positioning sleeve 26. A similar clutch shoe element is mounted pivotally on the second pin 19. The design of this element will be easily understood from the foregoing and by reference to the corresponding reference numerals 20–22 attached each with character "b." The follower drum 23 is formed on the periphery of its bows 23a with gear teeth 27 which mesh with those on a driven gear 28 which is mounted rigidly on a driven shaft, not shown. The latter gear is shown only schematically and partially in FIG. 3. A coil spring 29 is tensioned between pin 18 and the free end of the opposite clutch shoe element 20b–22b. Similarly, a coil spring is provided under tension between pin 19 and the free end of clutch shoe 20. Thus, both clutch shoes are normally kept in their contracted position as illustrated.

The operation of the above-described clutch assembly is as follows:

When the engine is started, rotation is transmitted therefrom through engine shaft 11, coupled flanges 11a and 10a to drive shaft 10, as conventionally. With the rotation of the drive shaft, ring 13, mounting rings 16 and 17 and rollers 15, clutch shoes 20 and 20b are also brought into rotation in unison, while the follower clutch drum and the like are kept stationary. When the engine speed reaches a predetermined value, the centrifugal force induced in the clutch shoes will overcome the contracting force provided by the tension springs 29 and 30 and the clutch shoe elements will start to expand, whereby the frictional elements 22 and 22b are brought into engagement with the inside wall surface of the follower drum 23. In this way, the drum is caused to rotate in the clockwise direction when seen in FIG. 1 and thus rotation is transmitted therefrom through meshing gears 27–28 to the driven shaft. Such operation is rather conventional. In the clutch assembly according to the invention, however, the engagement of the clutch elements with the follower drum will cause these elements and the mounting rings or which may be called "stabilizers" as a whole in the clockwise direction in FIG. 1, whereby rollers 15 will ride on the mating slopes or cam surfaces 14a and the clutch-expanding action is increased mechanically in the unique self-servo principle. If the inclination of the cam surface is reduced, the self-servo action will be correspondingly increased which means that the clutch assembly will be brought into operation at a lower engine speed, and vice versa. Thus, choice of the cam slope will influence greatly upon the clutch-operating speed of the driving engine.

When the engine speed is reduced beyond the predetermined value, the clutch shoe elements contract as conventionally under the influence of the tension springs 29–30 and thus no rotation will be transmitted from the drive shaft to the follower drum.

Figure 6:
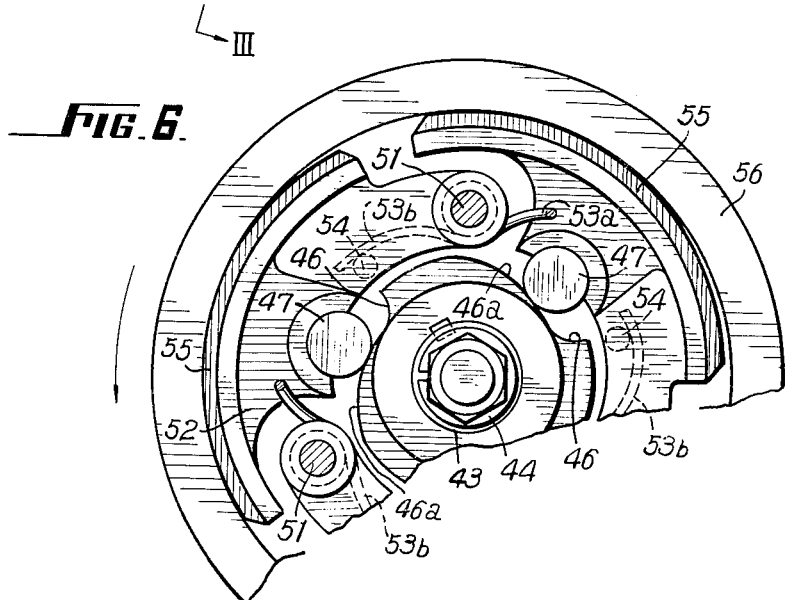
FIG. 6 is a similar view to FIG. 5, showing, however, the engaged conditions of the clutch.

Next, referring to FIGS. 4–6, a second embodiment of the invention will be described hereinbelow:

In this embodiment, the number of the servo-inducing rollers has been increased to three and the design of the clutch-shoe contracting spring means has been somewhat modified. In addition, power transmitting elements have been designed in a somewhat different manner.

40 represents an engine shaft corresponding to that denoted by numeral 11 in the preceding first embodiment.

The engine shaft has a reduced shaft end 40a on which a hollow drive shaft 41 is keyed. The reduced shaft end 40a is formed with an axial tapped bore 42 in which a fixing bolt 42a is threadingly fitted through the intermediary of a positioning ring 43 and a spring washer 44. The ring 43 abuts against an internal shoulder 45 formed on the inside wall of the bore of hollow shaft 41 for obtaining a positive positioning effect. Drive shaft 41 is formed integrally with a boss 41a which is provided with three symmetrically arranged axial recesses 46 similar to those denoted by 14 in the first embodiment. A roller 47 is loosely received in each of these recesses 46 which are formed at one side with smoothly curved, obtusely inclined cam surfaces 46a which correspond in their action to those denoted by 14a in the first embodiment. For preventing any axial displacement of rollers 47, ring plates or stabilizers 48 and 49 which are rotatably mounted on the drive shaft and embrace snugly, yet turnably said rollers from both sides when seen axially. Three symmetrically arranged pins 51 pass through the couple of the stabilizers and are positively fixed thereto by means of their headed ends as well as threaded ends as most clearly seen from FIG. 4, the latter ends being positively held in position by means of fixing nuts 50. A clutch shoe 52 is pivotally mounted at its one end on each of pins 51. The main part of a spring 53 is wound around the pivoted end of each of the clutch shoes. Each of the springs 53 has an extremity which is embedded in the free end of the adjacent clutch element and an extension 53b of the spring is kept in pressure abutment with a pin 54 which is fixedly mounted on the clutch shoe, and each spring is mounted in such way that these two neighboring shoes are urged to swivel inwardly about their pivots at 51, respectively. Further two similar springs 53 are provided and arranged in a similar way so that all the shoes are resiliently urged to swivel inwardly so as to keep the clutch assembly in its contracted position. Each of the clutch shoes 52 is provided on its outer periphery with a friction element 55 fixedly attached thereon as conventionally so as to cooperate with the inside wall of a follower drum 56 which is rotatably mounted on the outside periphery of drive shaft 41.

The outside periphery of the boss of follower drum 56 is formed into a belt pulley 59 which is drivingly connected through a V-belt with a driven pulley fixedly mounted on a driven shaft although these transmission means are not shown. Front cover assembly 60–61 is fixed to the front part of the follower drum 56 for preventing foreign matter and moisture from entering into the interior of the clutch assembly.

The operation of the seccond embodiment so far described is as follows:

When engine shaft 40 is rotated in the direction of arrow shown in FIG. 5 and the rotational speed reaches a predetermined value, the centrifugal force induced in the clutch shoes will overcome the counter-spring force so as to initiate the clutch-expanding operation. When the engagement of the frictional elements with the inside wall surface of follower drum 56 is established, the self-servo-action as described with reference to the first embodiment is brought into effect in the same way as before. In the present embodiment, the cam surface has a lighter inclination than the preceding embodiment and thus, when other conditions be assumed to be equal, the initiation of the self-servo-action will be invited at a slower engine speed. The wedging action produced by the rollers in cooperation with the related cam surfaces is attained just in the same way as before.

When the follower drum is thus entrained, motion is naturally transmitted from pulley 59 to the driven shaft as conventionally.

When the engine speed is reduced to the predetermined value, the clutch shoes contract under the influence of springs 53 and rollers 51 will return to their normal position at the bottom of each of the receiving recesses 46.

It will, of course, be understood that various changes may be made in the form, details, arrangement and proportion of the parts without departing from the scope of my invention which consists of the matter shown and described herein and set forth in the appended claims:

What I claim is:

1. A clutch assembly comprising a drive shaft mechanically connected with a prime mover, a ring member rigidly mounted on said shaft and having a plurality of separated axial recesses formed in the periphery of said member, a roller freely rotatable in each of said recesses, each recess being formed with a concave part-cylindrical surface on one side conforming to the surface of the roller and with a cam slope at the other side thereof, a plurality of pivotable clutch shoes mounted as a whole rotatably on and around said shaft, each of said shoes being provided with a semi-cylindrical recess for receiving rotatably one of said rollers, a driven member rotatably mounted on said shaft, spring means urging said shoes to swivel in their contracting direction, said cam slopes being adapted to urge mechanically said rollers and said shoes to move in their expanding direction for increasing the engaging pressure upon establishment of the centrifugal engagement of said shoes with said driven member.

2. A clutch assembly as set forth in claim 1, further comprising a couple of stabilizer rings rotatably mounted on said shaft and a plurality of pivot pins passing through said rings and rigidly secured thereto, each of said shoes being pivotably mounted on one of said pins.

3. A clutch assembly as set forth in claim 2, wherein one end of each of said springs is attached to one of said pivot pins and the other end of said spring is attached to the free end of the adjacent clutch shoe.

References Cited by the Examiner

UNITED STATES PATENTS

| 1,052,040 | 2/1913 | Cook et al. |
| 2,283,325 | 5/1942 | Fawick. |
| 2,555,772 | 6/1951 | Wickwire. |
| 3,026,980 | 3/1962 | Hoff. |

FOREIGN PATENTS

| 826,724 | 4/1938 | France. |
| 1,067,243 | 6/1954 | France. |
| 9,537 | 4/1910 | Great Britain. |

DON A. WAITE, *Primary Examiner.*

DAVID J. WILLIAMOWSKY, *Examiner.*